(12) United States Patent
Martin (10) Patent No.: US 10,762,214 B1
(45) Date of Patent: Sep. 1, 2020

(54) SYSTEM AND METHOD FOR EXTRACTING INFORMATION FROM BINARY FILES FOR VULNERABILITY DATABASE QUERIES

(71) Applicant: Harbor Labs LLC, Pikesville, MD (US)

(72) Inventor: Paul Martin, Baltimore, MD (US)

(73) Assignee: HARBOR LABS LLC, Pikesville, MD (US)

( * ) Notice: Subject to any disclaimer, the term of this patent is extended or adjusted under 35 U.S.C. 154(b) by 190 days.

(21) Appl. No.: 16/181,300

(22) Filed: Nov. 5, 2018

(51) Int. Cl.
*G06F 21/57* (2013.01)
*G06F 16/245* (2019.01)
*G06F 8/71* (2018.01)

(52) U.S. Cl.
CPC .......... *G06F 21/577* (2013.01); *G06F 16/245* (2019.01); *G06F 8/71* (2013.01); *G06F 2221/033* (2013.01)

(58) Field of Classification Search
CPC ............................. G06F 21/577; G06F 16/245
See application file for complete search history.

(56) References Cited

U.S. PATENT DOCUMENTS

| | | | | |
|---|---|---|---|---|
| 8,176,563 | B2 * | 5/2012 | Redlich | G06F 21/6209 713/166 |
| 9,158,915 | B1 * | 10/2015 | Yumer | G06F 21/566 |
| 9,569,201 | B1 | 2/2017 | Lotem et al. | |
| 9,749,349 | B1 * | 8/2017 | Czarny | G06F 21/577 |
| 10,089,473 | B2 | 10/2018 | Mahrous et al. | |
| 2004/0267775 | A1 * | 12/2004 | Azcona | G06F 16/258 |
| 2005/0200889 | A1 * | 9/2005 | Oomura | G03G 15/5079 358/1.15 |
| 2006/0112427 | A1 * | 5/2006 | Shahbazi | G06F 21/50 726/16 |
| 2006/0173913 | A1 * | 8/2006 | Aoyama | H04N 1/32128 |
| 2008/0250018 | A1 * | 10/2008 | Geffner | G06F 21/566 |
| 2010/0242028 | A1 * | 9/2010 | Weigert | G06F 21/105 717/131 |
| 2012/0159625 | A1 | 6/2012 | Jeong et al. | |
| 2012/0222122 | A1 * | 8/2012 | Das | G06F 21/577 726/25 |
| 2013/0318082 | A1 * | 11/2013 | Kataoka | G06F 16/152 707/736 |
| 2014/0082733 | A1 | 3/2014 | Benefield | |
| 2019/0075129 | A1 * | 3/2019 | Czarny | H05K 999/99 |
| 2019/0317968 | A1 * | 10/2019 | De Los Santos Vilchez | G06F 16/951 |
| 2020/0162484 | A1 * | 5/2020 | Solis Agea | G06F 21/53 |

* cited by examiner

*Primary Examiner* — Ali Shayanfar (57) ABSTRACT

Systems and methods are described for receiving an input binary file, extracting character string information from the input binary file, defining search parameters to include a software name and associated software version as a name-version pair, applying the search parameters to the extracted character string information to detect instances of the name-version pair, and querying a vulnerability database based on the name-version pair to identify a vulnerability in the input binary file.

18 Claims, 11 Drawing Sheets

| | | | | | | |
|---|---|---|---|---|---|---|
| 287472 | 2D72742D | 73656773 | 6C656674 | 20000000 | 2573202D | 2D72742D |
| 287520 | 742D302D | 61646472 | 73000000 | 202D2D72 | 742D302D | 6E6F742D |
| 287568 | 73656773 | 6C656674 | 00000000 | 20302D61 | 64647273 | 00000000 |
| 287616 | 72742D73 | 6567736C | 65667400 | 72742D6C | 656E0000 | 72742D30 |
| 287664 | 2D6E6F74 | 2D737472 | 69637400 | 2CEC0400 | 40870300 | 38EC0400 |
| 287712 | 0A290000 | 44000000 | 45000000 | 78746162 | 6C65735F | 7365745F |
| 287760 | 6D730000 | 5F2D3031 | 32333435 | 36373839 | 61626364 | 65666768 |
| 287808 | 4748494A | 4B4C4D4E | 4F505152 | 53545556 | 5758595A | 00000000 |
| 287856 | 11000000 | BC3D0400 | 88000000 | 7CBE0400 | 01000000 | A0E80400 |
| 287904 | 33000000 | 08EC0400 | 87000000 | C8DE0400 | 87000000 | 10EC0400 |
| 287952 | 6E202573 | 20757365 | 7320696E | 76616C69 | 64206F70 | 74696F6E |
| 288000 | 2063616C | 6C6F6320 | 6661696C | 65640000 | 69705B36 | 5D746162 |
| 288048 | 5D746162 | 6C65733A | 20726561 | 6C6C6F63 | 20666169 | 6C656400 |
| 288096 | 69656400 | 686F7374 | 2F6E6574 | 776F726B | 20602573 | 27206E6F |
| 288144 | 49505441 | 424C4553 | 5F4C4942 | 5F444952 | 00000000 | 49505441 |
| 288192 | 65642C20 | 75736520 | 58544142 | 4C45535F | 4C494244 | 49522E0A |
| 288240 | 49503654 | 41424C45 | 535F4C49 | 425F4449 | 52206973 | 20646570 |
| 288288 | 4449522E | 0A000000 | 2F70726F | 6A2F6D74 | 6B373134 | 39392F77 |
| 288336 | 2F50524F | 445F4252 | 2F445456 | 5F585F49 | 44545631 | 3430312F |
| 288384 | 6D6D6F6E | 2F766D5F | 6C696E75 | 782F6F73 | 732F736F | 75726365 |
| 288432 | 352F6269 | 6E2F6C69 | 622F7874 | 61626C65 | 73000000 | 6C696278 |
| 288480 | 4F20696E | 2025730A | 00000000 | 25733A20 | 496C6C65 | 67616C20 |
| 288528 | 732F6B65 | 726E656C | 2F6D6664 | 70726F62 | 65000000 | 2D710000 |
| 288576 | 77686574 | 68657220 | 72657669 | 73696F6E | 20257520 | 69732073 |
| 288624 | 2E0A0000 | 436F756C | 64206E6F | 74206F70 | 656E2073 | 6F636B65 |
| 288672 | 6F636B6F | 70742066 | 61696C65 | 64207374 | 72616E67 | 656C793A |
| 288720 | 76696365 | 20602573 | 27207370 | 65636966 | 69656400 | 696E7465 |
| 288768 | 73686F72 | 74657220 | 7468616E | 2049464E | 414D5349 | 5A202825 |
| 288816 | 63746572 | 20696E20 | 696E7465 | 72666163 | 65206025 | 73272028 |
| 288864 | 77656420 | 62792074 | 6865206B | 65726E65 | 6C292E0A | 00000000 |
| 288912 | 28257520 | 63686172 | 73206D61 | 78290000 | 69636D70 | 76360000 |
| 288960 | 73272061 | 6C726561 | 64792072 | 65676973 | 74657265 | 642E0A00 |
| 289008 | 69642073 | 697A6520 | 25752E0A | 00000000 | 436F756C | 646E2774 |
| 289056 | 74617267 | 65742060 | 25732720 | 616C7265 | 61647920 | 72656769 |
| 289104 | 25732720 | 68617320 | 696E7661 | 6C696420 | 73697A65 | 2025752E |
| 289152 | 20602573 | 270A0000 | 25733A20 | 6D617463 | 68202573 | 3C25753E |
| 289200 | 25733A20 | 6D617463 | 68202225 | 73222068 | 61732076 | 65727369 |
| 289248 | 75697265 | 642E0A00 | 25733A20 | 6D617463 | 68206025 | 73272068 |
| 289296 | 4255473A | 206D6174 | 63682025 | 73206861 | 7320696E | 76616C69 |
| 289344 | 74617267 | 65742025 | 733C2575 | 3E206973 | 206D6973 | 73696E67 |
| 289392 | 25732220 | 68617320 | 76657273 | 696F6E20 | 22257322 | 2C206275 |
| 289440 | 25733A20 | 74617267 | 65742060 | 25732720 | 68617320 | 696E7661 |
| 289488 | 67657420 | 25732068 | 61732069 | 6E76616C | 69642070 | 726F746F |

```
-rt-segsleft %s --rt-len %u --rt-0-res --r
t-0-addrs --rt-0-not-strict rt type:%s%d
segsleft 0-addrs 0-not-strict rt-type
rt-segsleft rt-len rt-0-res rt-0-addrs rt-0
-not-strict, Ï @á 8Ï B C Ï ¥° Ï
) D E xtables_set_nfproto xtables_set_para
ms  -0123456789abcdefghijklmnopqrstuvwxyzABCDEF
GHIJKLMNOPQRSTUVWXYZ "\'¥= f= Ñ ¶=
°= á |œ †Ë : ®Ë : ¶ 2 †°
3 Ï á »fi á Ï %s: Extensio
n %s uses invalid option value %d ip[6]tables:
 calloc failed ip[6]tables: malloc failed ip[6
]tables: realloc failed invalid mask '%s' specif
ied host/network '%s' not found XTABLES_LIBDIR
IPTABLES_LIB_DIR IPTABLES_LIB_DIR is deprecat
ed, use XTABLES_LIBDIR. IP6TABLES_LIB_DIR
IP6TABLES_LIB_DIR is deprecated, use XTABLES_LIB
DIR. /proj/mtk71499/ws_xiongfeng.wen_1401/DTV
/PROD_BR/DTV_X_IDTV1401/1-pdk/device/mediatek_co
mmon/vm/_linux/oss/source/iptables/iptables-1.4.1
5/bin/lib/xtables libxtables: unhandled NFPROT
o in %s %s: Illegal global params /proc/sy
s/kernel/modprobe -q %s: Could not determine
whether revision %u is supported, assuming it is
. Could not open socket to kernel: %s gets
ockopt failed strangely: %s invalid port/ser
vice '%s' specified interface name '%s' must be
shorter than IFNAMSIZ (%i) Warning: weird chara
cter in interface '%s' ('/' and ' ' are not allo
wed by the kernel). Invalid match name "%s"
(%u chars max) icmpv6 ipv6-icmp %s: match '%
s' already registered. %s: match '%s' has inval
id size %u. Couldn't find match '%s' %s:
target '%s' already registered. %s: target '
%s' has invalid size %u. Couldn't find target
'%s' %s: match %s<%u> is missing a version
%s: match "%s" has version "%s", but "%s" is req
uired. %s: match '%s' has invalid name %s:
BUG: match %s has invalid protocol family %s:
target %s<%u> is missing a version %s: target "
%s" has version "%s", but "%s" is required.
%s: target '%s' has invalid name %s: BUG: tar
get %s has invalid protocol family %s: "%s" opt
```

```
bash-3.2# strings ip6tables | grep iptables
[iptables
iptables-save
iptables-restore
iptables-xml
<iptables-rules version="1.0">
</iptables-rules>
# Generated by iptables-save v%s on %s
iptables: %s. Run `dmesg' for more information.
iptables: %s.
Perhaps iptables or your kernel needs to be upgraded.
Error (line is ignored by iptables-restore)
This is the IPv4 version of iptables.
can't initialize iptables table `%s': %s
Nothing (line is ignored by iptables-restore)
iptables who? (do you need to insmod?)
/proj/mtk71499/ws_xiongfeng.wen_1401/DTV/PROD_BR/DTV_X_IDTV1401/1-pdk/device/mediatek_common
/vm_linux/oss/source/iptables/iptables-1.4.157bin/lib/xtables
```

FIG. 4A

```
[bash-3.2# strings iptables-restore | grep iptables
iptables
iptables-save
iptables-restore
iptables-xml
<iptables-rules version="1.0">
</iptables-rules>
# Generated by iptables-save v%s on %s
iptables: %s, Run 'dmesg' for more information.
iptables: %s.
Perhaps iptables or your kernel needs to be upgraded.
Error (line is ignored by iptables-restore)
This is the IPv4 version of iptables.
can't initialize iptables table '%s': %s
Nothing (line is ignored by iptables-restore)
iptables who? (do you need to insmod?)
/proj/mtk71499/ws_xiongfeng.wen_1401/DTV/PROD_BR/DTV X IDTV1401/l-pdk/device/mediatek_common
/vm_linux/oss/source/iptables/iptables-1.4.15/bin/lib/xtables
```

FIG. 4B

```
version: (\d+[\.\d]*[\w]*)
```

FIG. 5

```
file: ip6tables
ld-linux 3
libm 6
libgcc_s 1
libc 6
glibc 2.4
glibc 2.7
gcc 3.5
libxtables 7
iptables 1.4.15
```

FIG. 6

```
SELECT nvd.cve_id, nvd.summary, nvd.score from nvd INNER JOIN map ON nvd.cve_id =
map.cve_id INNER JOIN product ON product.product_id = map.product_id WHERE
product.name='iptables' and product.version_valve='1.4.15';
```

FIG. 7A

```
SELECT nvd.cve_id, nvd.summary, nvd.score from nvd INNER JOIN map ON nvd.cve_id =
map.cve_id INNER JOIN product ON product.product_id = map.product_id WHERE product.summary
LIKE 'iptables-restore' and product.version_valve='1.4.15';
```

```
{
    "title": "CVE-2012-2663",
    "details": "extension/libxt_tcp.c in iptables through 1.4.21 does not match TCP SYN+FIN packets in --syn rules, which might allow remote attackers to bypass intended firewall restrictions via crafted packets. NOTE: the CVE-2012-6638 fix makes this issue less relevant.",
    "cvss": 7.5,
    "confidence": 1.0,
    "source": [
"_00205301_10040000.pkg.extracted_squashfs-root/bin/iptables/iptables-1.4.15/iptables"
    ],
    "ref": ""
},
```

FIG. 9

SYSTEM AND METHOD FOR EXTRACTING INFORMATION FROM BINARY FILES FOR VULNERABILITY DATABASE QUERIES

FIELD OF THE INVENTION

The invention pertains to the field of computer security. More particularly, the invention pertains to software security and to processing a binary for information to be used in correlating the binary to known vulnerabilities stored in a vulnerability database.

BACKGROUND OF THE INVENTION

There are many tools today that purport to discover new security vulnerabilities in binary software. However, these tools often yield false positives and, most importantly, they are frequently incapable of finding many types of vulnerabilities. Many vulnerabilities in software products are publicly announced, and given a binary file, it may be desirable to identify the publicly known vulnerabilities in that binary. This is typically accomplished by manually searching a vulnerability database using a package name and version number of a binary file. However, package names and version numbers are often not visible in many types of binary files, and there are no known techniques for automatically extracting information about program version numbers from binary files for the purposes of performing a database lookup in a vulnerability database.

It is commonly known in the field that binary executables and libraries typically contain American Standard Code for Information Interchange (ASCII) text. The GNU strings utility, part of the binutils package since at least 1991, is designed to extract such text from binary data. It is a common convention for most command-line based software that runs on UNIX-like platforms including macOS and Linux to contain a message with the package or product name and the software version number somewhere in the binary executable. These messages are often, but not always, displayed to the user when the relevant binary is invoked with a special flag. Similarly, many software products embed this information in a binary along with a copyright message.

Regular expressions (regex), which were invented in 1951, are commonly used to parse text strings to match substrings conforming to certain patterns. These regex pattern matching techniques have been implemented in a variety of programming languages including C, C++, PERL, Python, Java, JavaScript, PHP and others. Regexes are commonly used by programmers for text parsing. There have been attempts in the past to use regexes to parse version numbers out of arbitrary text strings. However, because the set of possible input data to a regular expression is very large, and because the constitution of a version string is ambiguous, these regex-based approaches yield imperfect results. For example, 0.9.8b may be a valid version string for one software product, whereas 0.9.8beta is not. Alternately, it is possible that the inverse is true: 0.9.8beta is valid but 0.9.8b is not. These two facts are contradictory; a regex cannot properly match a version number for both products.

There have been numerous tools created to cross-reference a binary or a list of binaries with a vulnerability database to yield a set of known vulnerabilities in a list of software. These tools have invariably required that the package name and version be known before any cross-referencing can occur. For example, cve-check-tool (https://github.com/clearlinux/cve-check-tool), created by Intel, can find vulnerabilities in Linux packages installed on a Desktop operating system by cross-referencing a pre-determined list of installed packages from a supported package manager with a vulnerability database. There exist other, similar tools that can find known vulnerabilities in a software binary if the package name and version number are already known. For example, U.S. Patent Publication No. 2014/0082733A1 describes a system that can find known vulnerabilities in software assets provided that the asset has already been identified.

These known tools are deterministic; they do not support uncertainty in either the package name or the version number. That is, if a package name or version is not quite correct, the tools fail to find vulnerabilities. Furthermore, the tools do not analyze individual executables directly but rather they analyze information about executables, such as metadata.

Other known systems resolve a set of vulnerabilities to a list of packages where the names in the package list don't match up exactly with the vulnerability names. For example, U.S. Pat. No. 10,089,473 describes matching vulnerabilities to a pre-existing list of software while having imprecision in the software names. It approaches the problem using lexical distance measurements and a form of fuzzy matching on the CPE name. However, the method described therein does not start with a binary and the starting list used contains substantially more information than can typically be gleaned from a binary.

For example, binaries don't typically include a vendor name, product name and version in a parseable format. Specifically, it is typically only a <name, version> pair that can be readily parsed out. Furthermore, versions in a binary are often only extractable with imprecision that is not found in a manifest of installed products.

Most importantly, related work has not solved the problem of generating a list of software to cross-reference with a database. This is a difficult and non-trivial task and a proper solution is a significant contribution to the field of vulnerability mapping. To date, there have not been any successful attempts to extract package names and version numbers from a binary file without any additional outside context; to either individually or collectively select candidates for cross-reference, and then to cross-reference the information with a database using a fuzzy-matching technique to mitigate the potential errors caused by applying a regex to an arbitrary text string. Such an approach would be useful in discovering known vulnerabilities in software on platforms where a list of installed packages is not available, as is commonly the case on Linux-based firmware images.

SUMMARY OF THE INVENTION

This invention relates to automatically extracting useful information, such as a package name and version number, from binaries for the purpose of performing a database lookup based on the extracted information to identify known security vulnerabilities.

One way to obtain useful information from a binary file is to extract text strings that match a desired template. One way to accomplish this is to create a search string and then to compare text strings in the binary file to the search string. One common type of search string is a regular expression. A regular expression is a character-based sequence of rules that are used to match strings fitting a particular format.

Once a search string, or a collection of search strings, has been crafted, the strings are applied to the binary to extract text strings inside of the binary that match the desired characteristics. This can be accomplished by first extracting multiple text strings from the binary file and then by running the search over these strings. Another approach is to search through text strings in the binary file directly. The former method is faster but less inclusive, as any strings split by non-printable characters will not be extracted during the original string extraction step. The second method covers more cases but is slower as the search strings must each be run against the entire binary file. There are pros and cons to both methods; however, either method may be reasonable under the appropriate conditions.

For example, a regular expression used to search for a version number may look like this: version\s+(\d+\w?). This would match any text string that started with "version", followed by one or more space characters, one or more digits, and finally an optional word character at the end. Thus, the regular expression would match the following text strings: version 12a, version 5b, version 1 but not version3 (no space). The parentheses in the expression denote a grouping. In this case, the grouping would contain the specific version number that was matched: 12a, 5b or 1.

These strings can then be used as part of a database query to cross-reference information from a binary file with information in a database. For example, a package name and version number can be extracted from a binary executable file. The extracted name and version number can then be used to query a vulnerability database for a list of known vulnerabilities associated with the extracted version and package name.

This invention provides a method to extract byte strings matching a certain predefined set of rules from a binary file. It then uses these strings in one or more database queries to cross-reference information derived from a binary file format with information stored in a database. In one embodiment of this invention, the queries can use fuzzy matching.

BRIEF DESCRIPTION OF THE DRAWINGS

FIG. 3 illustrates the raw bytes of a binary file along with strings encoded in the binary.

DETAILED DESCRIPTION OF THE INVENTION

Some embodiments of the invention determine whether binary files consisting of executable code (such as libraries or applications) contain any known vulnerabilities. This problem is difficult to solve because known vulnerabilities are typically stored in databases keyed to the name and version of the package from which the affected binary was built but there is no standardized way to store this information in binaries on UNIX-like systems (such as Linux, FreeBSD, Android, macOS and iOS). Thus, it is difficult to match up a binary file to a list of known vulnerabilities in that file using a standard vulnerability database.

Binary files are used to represent software applications, software libraries, databases, or any number of other ideas or expressions. Binary files often also contain text strings. For example, a compiled program is a type of binary file that often contains text strings of output provided to the user during the execution of the program. Binary files can be processed in a variety of ways. One type of processing relies on extracting text strings from a binary file by opening the file in memory and scanning through it for printable characters. These printable characters can be output to the screen, typically as contiguous sequence of printable characters, one sequence per line. While binary files are readable by a computer, they are not designed to be manually parsed or interpreted by a human without significant effort.

The sequences of characters can be processed to yield information. For example, a particular sequence of characters may contain information related to the package name from which a binary was compiled. A different sequence may contain information related to the version of the package from which the binary was compiled.

There exist databases that contain information about binaries. These databases can be correlated with information extracted from binaries. For example, the National Vulnerability Database (NVD) contains a listing of known vulnerabilities that exist in a given package (e.g. that apply to a specific collection of binaries). The NVD can be queried based on a package name and a package version. As described herein, often this information can be extracted from a sample binary.

For example, the NIST NVD assigns identifiers to vulnerabilities called "Common Vulnerabilities and Exposures." As a further example, CVE-2016-7048 applies to a particular binary file in versions "9.3.15, 9.4.x before 9.4.10, and 9.5.x before 9.5.5" of the PostgreSQL package: the installer. On Linux, binary files such as the PostgreSQL installer are encoded in a file format called Extensible Linker Format (ELF). The ELF specification does not contain a particular field to store a package name or a package version. Furthermore, on Linux, binary files can be given arbitrary names that don't correspond to the package from which they or their source code was distributed. Thus, there is no straightforward way to determine whether a particular binary file corresponds to a particular version of a particular package.

Figure 1:
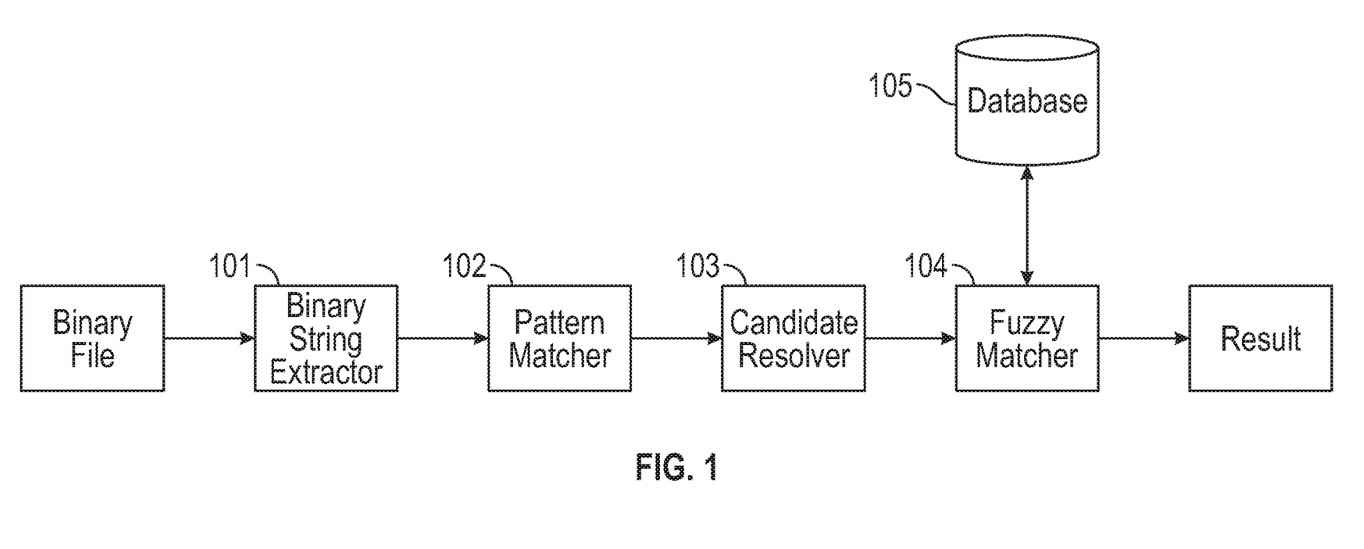
FIG. 1 illustrates an example of the overall system.

As illustrated in FIG. 1, one embodiment of the invention described herein consists of a binary string extractor (101), a collection of binary string pattern matchers (102), a candidate resolver (103), and fuzzy matcher (104) for querying a database system (105) with a variety of inputs derived from each candidate.

Figure 2A:
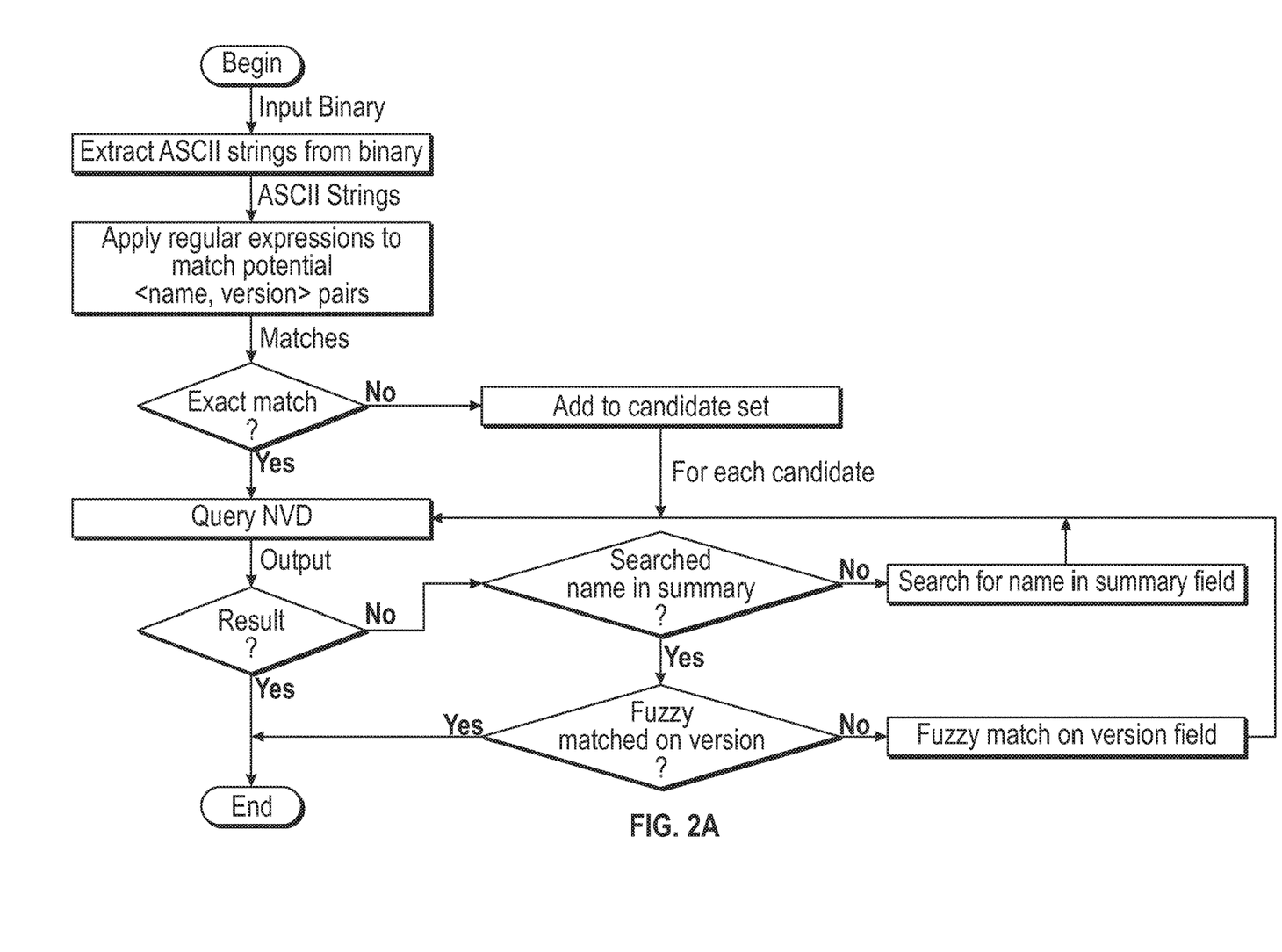
FIG. 2a illustrates an example embodiment in which it is determined if a binary file contains known vulnerabilities.
Figure 2B:
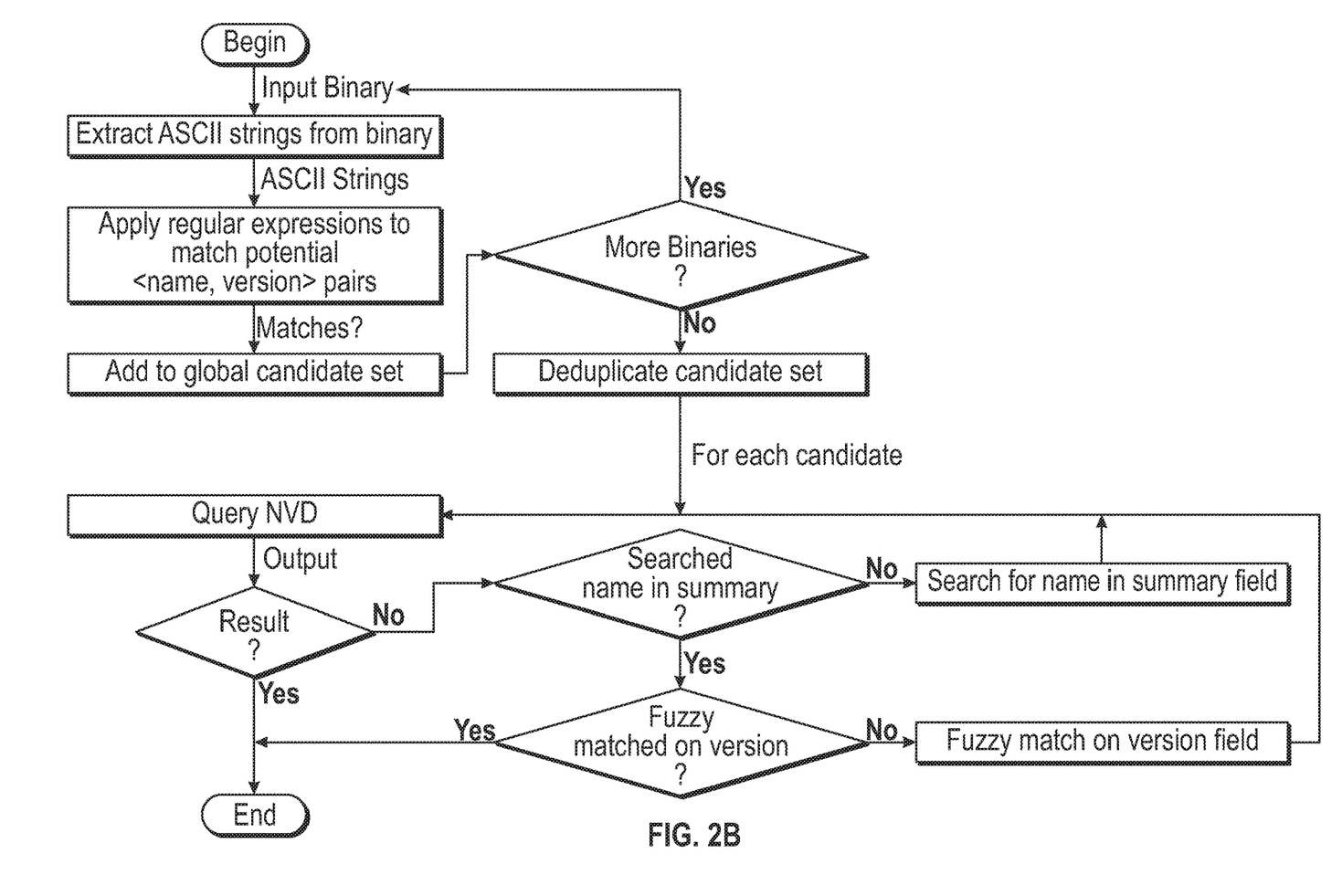
FIG. 2b illustrates an example embodiment in which it is determined if a set of binary files contains known vulnerabilities.

Example embodiments of the inventive methods are illustrated in FIGS. 2a and 2b. As illustrated in FIG. 2a, the system can operate on a single binary file as input, or as illustrated in FIG. 2b, the system can operate on multiple binaries in the same operation.

As a further non-limiting example, these methods can be used to extract version information from Linux files and then to use the version information to search the NIST National Vulnerability Database (NVD). The NIST database maps product names and version numbers to software vulnerabilities. The invention described herein works whether the NVD database resides locally or is accessed online from a remote location. As a non-limiting example, the local database can be an offline copy of the National Vulnerability Database with modifications made to allow querying as described in this example.

Binary files often contain text strings which are used by the software for a variety of purposes. For example, any error messages or output messages displayed by the program to the user are typically encoded in text strings stored in the binary file. On UNIX-like operating systems, most binary files store text strings that describe the package from which a file originated as well as the package version. Typically, this is part of a message displayed to the user when the user runs the software using a "version" flag to output information about the software version.

The binary string extractor processes an input binary file containing encoded-text as well as non-text data. For example, FIG. 3 illustrates text strings found in the ip6tables binary extracted from a Linux-based firmware image. The string extractor can extract some or all text strings from the binary encoded in a encoding scheme. In one embodiment, the binary string extractor may find and extract all or a subset of all printable ASCII characters from a binary. The resulting information returned will be a list of strings of contiguous bytes that successfully decode as printable ASCII characters. In another embodiment, non-printable ASCII characters may be considered as well. In another embodiment, an encoding scheme other than ASCII may be used by the binary string extractor. In another embodiment, the binary string extractor may extract sequences of bytes rather than textual strings.

Figure 4A:
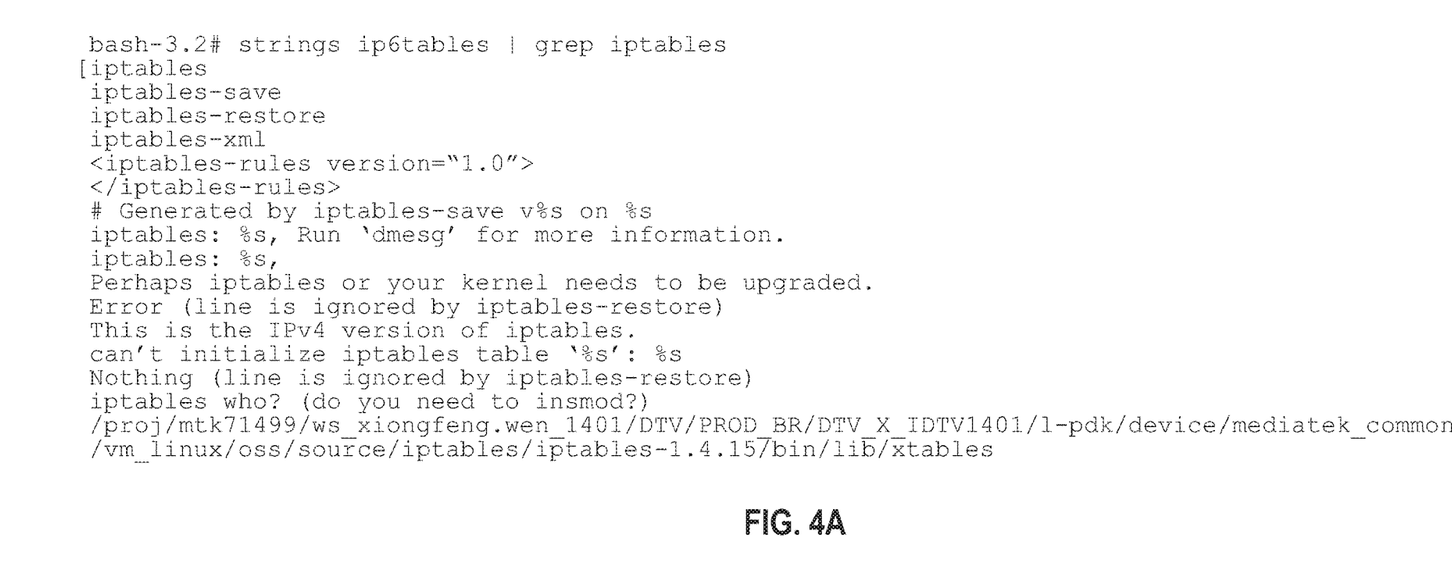
FIGS. 4a and 4b illustrate truncated lists of strings extracted from a binary file.
Figure 4B:
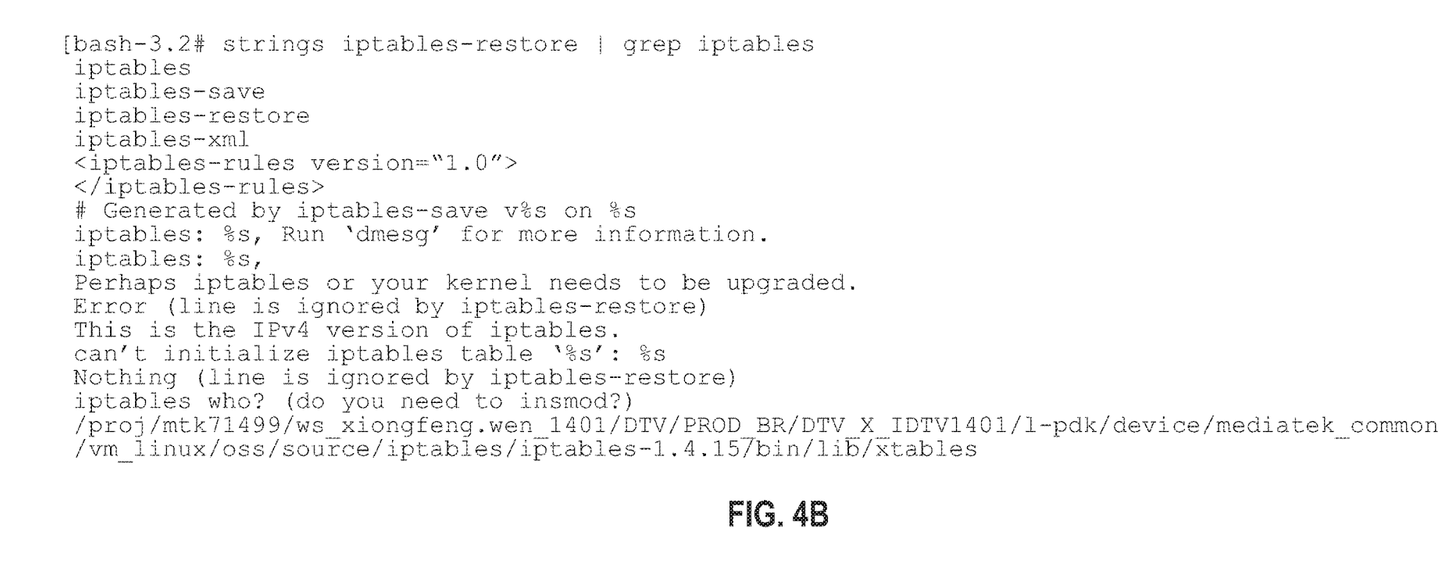

While the binary string extractor is illustrated in this embodiment, there exist other embodiments of this invention that contemplate a situation where the binary string extraction process is not discrete and instead where string matchers are applied directly to the raw bytes of the binary without any preprocessing. That is, having the preprocessing string extraction step as its own discreet step is optional. In some embodiments, ASCII strings are extracted from the binary file to yield a set of strings in the file. As illustrated in FIG. 4a, the ip6tables binary illustrated in FIG. 3 contains a version string. As illustrated in FIG. 4b, another binary from the same package, iptables-restore, also contains a version string for iptables.

In this embodiment of the invention, the extracted strings are fed through one of more binary string pattern matchers. These string matchers perform two tasks:
  1. Match strings conforming to a particular format; and
  2. Extract one or more features from a matched string.

The binary string pattern matchers may be implemented as regular expressions, as automata, as raw code, or through any other method that can be used to select strings conforming to a particular format. That is, that the binary string extractors can extract information in various formats including by examining raw bytes, by interpreting raw bytes as a character or character string, by interpreting raw bytes as an integer, or a floating-point value, etc.

Figure 5:
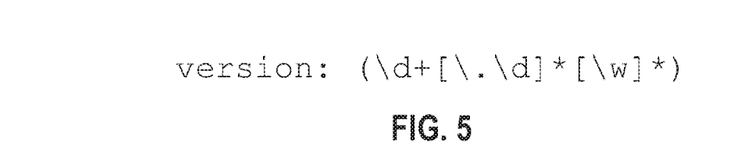
FIG. 5 illustrates an example regular expression used to extract relevant data from binary strings.
Figure 6:
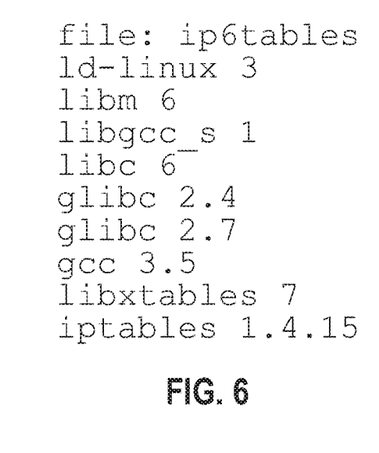
FIG. 6 illustrates an example candidates list.

In some embodiments, to discern the proper <name, version> pair corresponding to an ELF executable, the extracted ASCII strings are processed using a series of regular expressions (as illustrated in the example of FIG. 5) to find any that match a known version string format. For each string that matches a regular expression, the system can extract a candidate name and version number and store each unique extracted <name, version> string in a candidate list. As illustrated in the example of FIG. 6, there were several candidates extracted from the ip6tables binary illustrated in previous figures.

The regular expressions are designed to match strings that fit a given template. However, version numbers stored as strings in a binary can be represented in other possible formats. In some embodiments, the regular expressions are constructed by constructing at least one regular expression by gathering a set of binary input files; analyzing character string information from the set of binary input files; extracting version strings from the set of binary input files; grouping the version strings by similarity amongst the version strings; and constructing a set of regular expressions to match at least two of the version strings.

In some embodiments of the invention, the string extraction process is integrated with the binary string extraction. In these embodiments, the binary string matchers are run over the entire binary. In such a case, the binary string matcher separates out multiple matches and can extract multiple feature vectors in a single pass. Similarly, in other embodiments of the invention, the string matchers extract one or more features from the matched string. These embodiments can then query the database based on these derived features rather than based on the raw extracted data.

In some example embodiments, <name, version> matches can be placed into a candidate set. If an extracted name matches the filename of the ELF executable and if there is only one unique <name, version> pair for that name, then other candidates are removed from the list and it is determined to be an exact match. Otherwise, the method proceeds with multiple candidates, and queries are executed on the database using each candidate <name, version> pair to return a set of multiple results.

In some embodiments, this candidate set is local to a single binary file. In such a case, if there is no exact match for the binary, potential <name, version> matches are added to the candidate set. In other embodiments, the candidate set is global. Multiple <name, version> matches extracted from multiple binaries are added to the global candidate set before lookups are performed. This second scenario is useful for attempting to match multiple binaries in a firmware image, for example, because names and versions of libraries that a binary is linked against may be resident in the binary and the referenced library itself may not have a <name, version> pair to extract.

In some embodiments, the candidates list can first be filtered. One such technique may use second-order match against information external to the binary file (such as metadata) or by using a second-order match against information internal to the binary file (such as other extracted data). The second order match could be a direct comparison or a fuzzy match. Alternately, the candidates list may be deduplicated or otherwise filtered to reduce the number of required lookups on the data store.

In one embodiment, the set is filtered by grouping multiple versions associated with a particular name together and then by taking the highest or a relatively high number from the group. For example, if <iptables, 2>, <iptables, 2.1> and <iptables, 2.2> were in the set, then <iptables, 2.2> would be kept in the candidates list while the other entries would be removed. The candidates list can further be filtered based on a blacklist or whitelist of particular binaries.

In one example embodiment, the NVD or a local copy of the NVD is queried using product names and versions to return information about vulnerabilities in the specified version of the product. As it should be clear that the binary string extraction process may not return a set of uniform strings, in some embodiments of the invention, the data querying step will rely upon fuzzy matching. In this context, fuzzy matching can be used to query a data store with a tolerance for error in the query information. That is, the system may query a data store and only require part of the query string to match information in the data store for a result to be returned. Alternately, the system may receive an input string to use as part of a query, and may compute multiple alternate strings which are used in multiple separate queries. The returned results may be the union of the query results or any subset thereof.

Figure 7A:
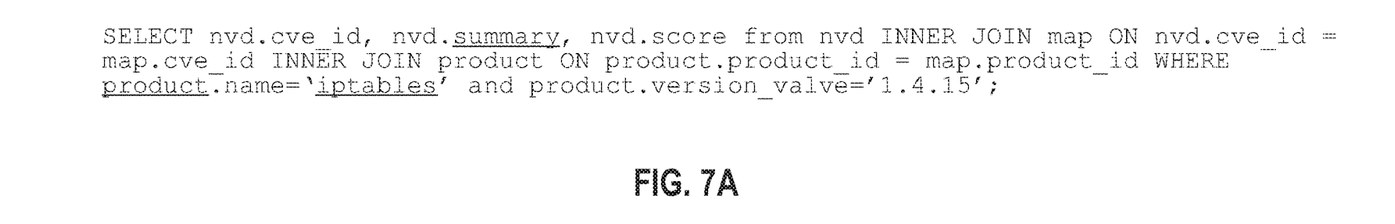
FIGS. 7a and 7b illustrate example database queries to find vulnerabilities in a binary.

In this embodiment, the system begins by querying the NVD directly on the name and version. FIG. 7a illustrates an example query built from the ip6tables example binary. If no matches are found, the system first checks if the product name is present in the database. If the product name is not present in the database, the system can be configured to modify the original query further by determining if the summary field contains the product name instead.

Figure 7B:
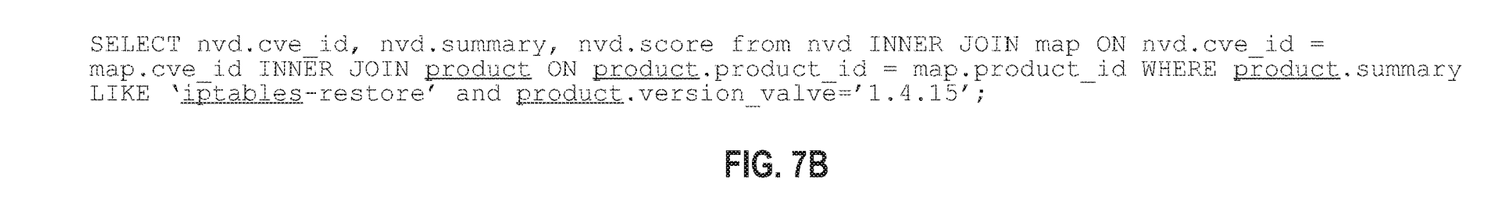
Figure 8:
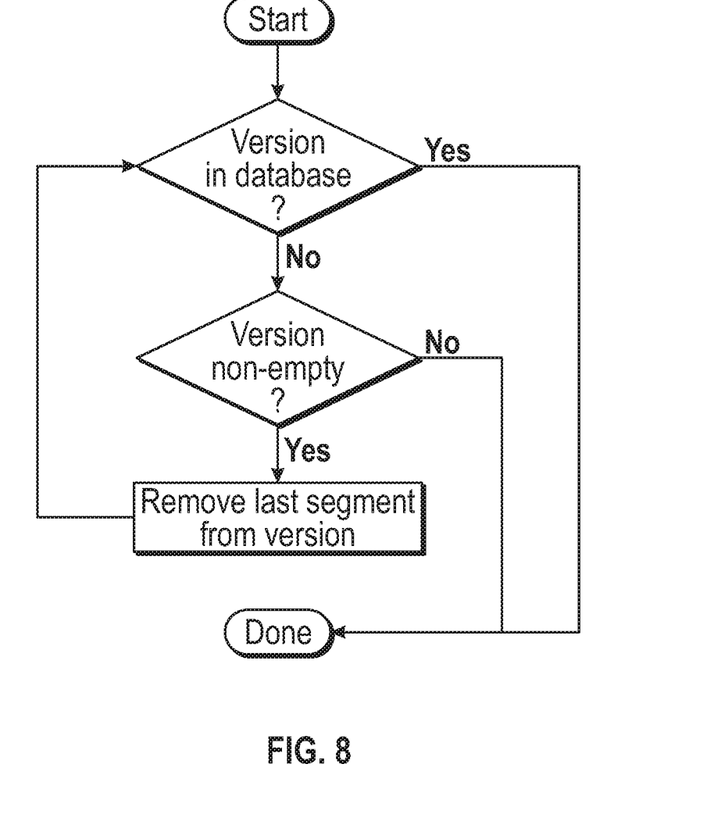
FIG. 8 illustrates an example fuzzy version matching algorithm.

FIG. 7b illustrates an example query constructed from the iptables-restore binary that is part of the iptables package along with the ip6tables binary (and other files). If the product name is present, the system can relax the original query by incrementally removing segments from the end of the version string, as illustrated in FIG. 8. In this embodiment, a segment is defined as a letter or as a delimited sequence of numbers (such as 0.48). For example, if a version string is 3.48. vers, the system can start by using the string 3.48.vers in the query. If this fails, the system can then try 3.48.ver. If that fails, the system can then try 3.48.ve and so on.

In other embodiments of the invention, the database may be queried based on features extracted from a binary file or based on information derived from features extracted from a binary file. The information stored in the database would correspond accordingly.

Figure 9:
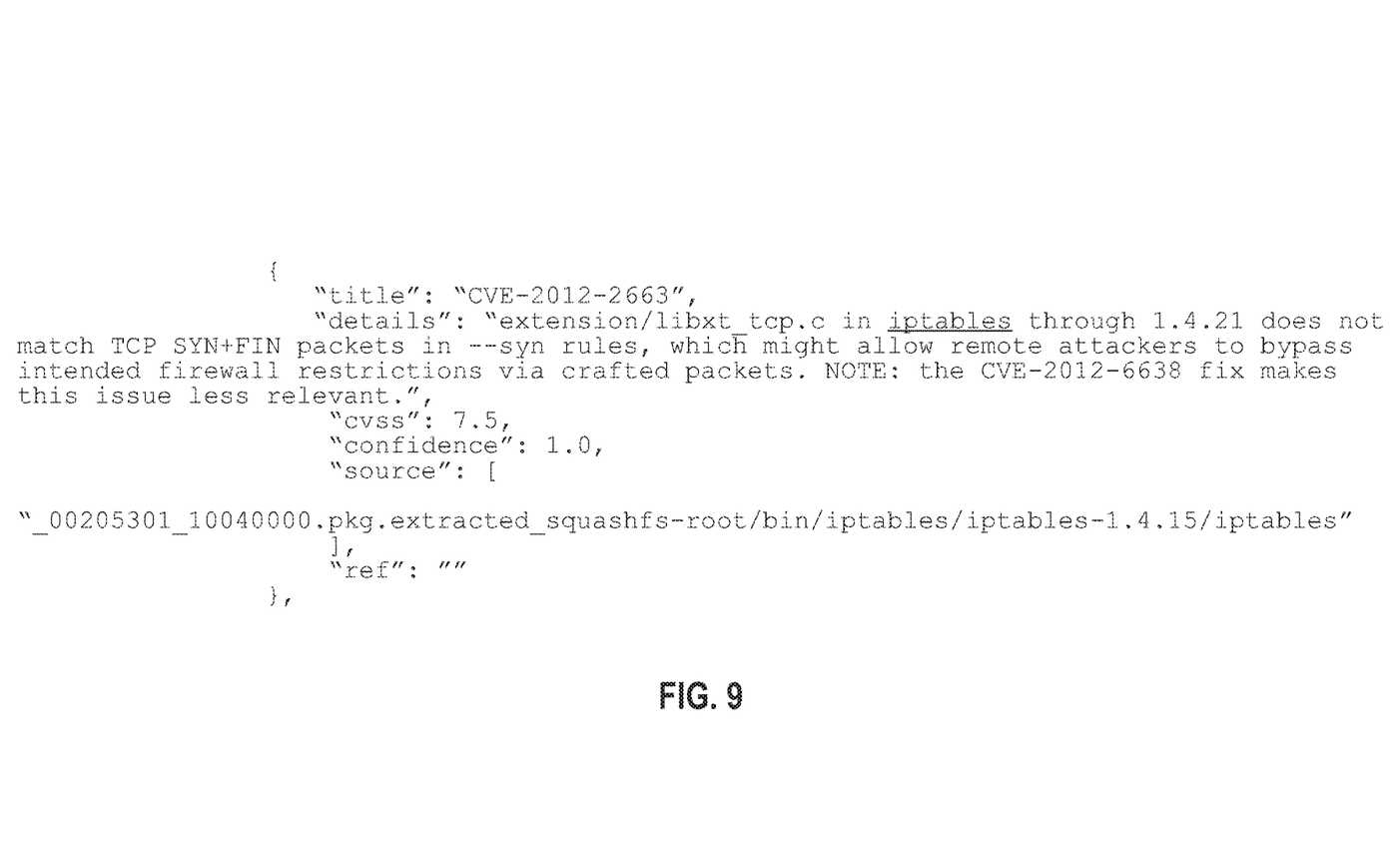
FIG. 9 illustrates an example result in JSON format.

The method then returns a list of multiple matches based on the results of the queries. An example of the final match results mapping a CVE to iptables is illustrated in FIG. 9.

In some embodiments, the CVE lookup algorithm can be executed as follows:

In one embodiment, the system performs information extraction based on parsing metadata such as filename, file properties, information embedded in an ELF or PE header.
  a. If successful, perform the following steps to find potential matches for other software on the system.
  b. If unsuccessful, perform the following steps to attempt to discern the filename and/or other potential matches on the system.

In other embodiments, the system does not first perform information extraction based on parsing metadata and instead immediately proceeds to the following steps:
  1. Extract strings from a binary or search over the binary directly without directly extracting the strings.
  2. For each string, compare to one or more search string. In some embodiments, the search string is a regular expression. In other embodiments, the search string can be programmatic code or any other string-matching function.
  3. In one embodiment, multiple string matches are processed according to an algorithm and the results of the processing are used as matches. In some embodiments, the system adds the extracted strings or the results of processing the extracted strings to a set of candidate matches. In other embodiments, the system determines an optimal match instead and discard other matches.

In some embodiments, the system may also perform a second order matching operation in which extracted information or derived features are compared to external information to filter extracted information.

In some embodiments in which a set of candidate matches has been created, the system can deduplicate set of potential file versions by:
  a. Removing duplicates in potential file versions set from potential file versions set; and/or
  b. Removing duplicates that have an exact match from the potential file versions set.
  4. Use extracted information or derived features as part of a query on an information store. In one embodiment, the information store is a vulnerability database. In some embodiments, the system can also use fuzzy matching to relax the query if a given database query does not result in a match. In other embodiments, a direct match can be required.

It is to be understood that the embodiments of the invention herein described are merely illustrative of the application of the principles of the invention. Reference herein to details of the illustrated embodiments is not intended to limit the scope of the claims, which themselves recite those features regarded as essential to the invention.

The present invention has been described detail with respect to possible embodiments. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements, or entirely in software elements. Also, the particular division of functionality between the various system components described herein are merely examples, and not mandatory; functions performed by a single system component may instead be performed by multiple components, and functions performed by multiple components may instead be performed by a single component.

In various embodiments, the present invention can be implemented as a system or a method for performing the above-described techniques, either singly or in any combination. In another embodiment, the present invention can be implemented as a computer program product comprising a nontransitory computer-readable storage medium and computer program code, encoded on the medium, for causing a processor in a computing device or other electronic device to perform the above-described techniques.

Reference in the specification to "one embodiment" or to "an embodiment" means that a particular feature, structure, or characteristic described in connection with the embodiments is included in at least one embodiment of the invention. The appearances of the phrase "in at least one embodiment" in various places in the specification are not necessarily all referring to the same embodiment.

Some portions of the above are presented in terms of algorithms and symbolic representations of operations on data bits within a memory of a computing device. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention can be embodied in software, firmware and/or hardware, and when embodied in software, can be downloaded to reside on and be operated from different platforms used by a variety of operating systems.

The present invention also relates to an apparatus for performing the operations herein. This apparatus may be specially constructed for the required purposes, or it may comprise a general-purpose computing device selectively activated or reconfigured by a computer program stored in the computing device. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, flash memory, solid state drives, magnetic or optical cards, application specific integrated circuits (ASICs), or any type of media suitable for storing electronic instructions, and each coupled to a computer system bus. Further, the computing devices referred to herein may include a single processor or may be architectures employing multiple processor designs for increased computing capability.

The algorithms and displays presented herein are not inherently related to any particular computing device, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description provided herein. In addition, the present invention is not described with reference to any particular programming language. It will be appreciated that a variety of programming languages may be used to implement the teachings of the present invention as described herein, and any references above to specific languages are provided for disclosure of enablement and best mode of the present invention.

Accordingly, in various embodiments, the present invention can be implemented as software, hardware, and/or other elements for controlling a computer system, computing device, or other electronic device, or any combination or plurality thereof. Such an electronic device can include, for example, a processor, an input device (such as a keyboard, mouse, touchpad, trackpad, joystick, trackball, microphone, and/or any combination thereof), an output device (such as a screen, speaker, and/or the like), memory, long-term storage (such as magnetic storage, optical storage, and/or the like), and/or network connectivity, according to techniques that are well known in the art. Such an electronic device may be portable or nonportable. Examples of electronic devices that may be used for implementing the invention include: a mobile phone, personal digital assistant, smartphone, kiosk, server computer, enterprise computing device, desktop computer, laptop computer, tablet computer, consumer electronic device, television, set-top box, or the like. An electronic device for implementing the present invention may use any operating system such as, for example: Linux; Microsoft Windows, available from Microsoft Corporation of Redmond, Wash.; Mac OS X, available from Apple Inc. of Cupertino, Calif.; iOS, available from Apple Inc. of Cupertino, Calif.; and/or any other operating system that is adapted for use on the device.

While the invention has been described with respect to a limited number of embodiments, those skilled in the art, having benefit of the above description, will appreciate that other embodiments may be devised which do not depart from the scope of the present invention as described herein. In addition, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

What is claimed is:

1. A method for automatically identifying and extracting vulnerability information from binary files, the method comprising:
    processing an input binary file having a filename;
    extracting the filename and character string information from the input binary file into one or more separate data locations;
    defining search parameters to include the filename and an associated software version as a name-version pair;
    applying the defined search parameters to the extracted character string information in the one or more separate data locations to detect an instance of the name-version pair;
    if a match of the filename is found in the extracted information, then querying a vulnerability database of standards-based vulnerability management data based on the extracted name-version pair to identify a vulnerability in the input binary file; and
    if a match of the name-version pair is not detected, then:
        adding the name-version pair to a candidate set comprising multiple different software names and potential versions found in the input binary file;
        for a plurality of the name-version pairs in the candidate set, querying the vulnerability database for the software name;
        if any software names are found in the vulnerability database, then searching for a match on the associated software version;
        wherein if each software version query results in no match, then constructing a relaxed query by modifying the extracted character string information and performing a revised query; and
    returning a result set comprising vulnerability information for the input binary file.

2. The method of claim 1, wherein the search parameters are pattern matching instructions.

3. The method of claim 2, wherein the pattern matching instructions are provided as at least one regular expression.

4. The method of claim 3, further comprising constructing the at least one regular expression by:
   analyzing the extracted character string information from a set of binary input files by extracting version strings from the set of binary input files and grouping the extracted version strings by similarity amongst the version strings; and
   constructing a set of regular expressions to match at least two of the version strings having been grouped by similarity.

5. The method of claim 1, wherein all or part of the output of the pattern matching is processed to generate a filtered subset before the database query and wherein the database is queried based on the processed information.

6. The method of claim 1, further comprising:
   receiving multiple input binary files; and
   extracting character string information from the multiple input binary files.

7. The method of claim 1, wherein the vulnerability is a security vulnerability in a Linux-based firmware image.

8. The method of claim 1, wherein the binary file is a library or an application.

9. The method of claim 1, wherein the character string information is encoded in either ASCII or Unicode format.

10. A system for automatically identifying and extracting vulnerability information from binary files, the system comprising:
    a data store configured for receiving an input binary file having a filename;
    a processor configured for:
    extracting the filename and character string information from the input binary file into one or more separate data locations;
    defining search parameters to include the filename and an associated software version as a name-version pair;
    applying the defined search parameters to the extracted character string information in the one or more separate data locations to detect an instance of the name-version pair;
    if a match of the filename is found in the extracted information, then querying a vulnerability database of standards-based vulnerability management data based on the extracted name-version pair to identify a vulnerability in the input binary file; and
    if a match of the name-version pair is not detected, then:
      adding the name-version pair to a candidate set comprising multiple different software names and potential versions found in the input binary file;
      for a plurality of the name-version pairs in the candidate set, querying the vulnerability database for the software name;
      if any software names are found in the vulnerability database, then searching for a match on the associated software version;
      wherein if each software version query results in no match, then constructing a relaxed query by modifying the extracted character string information and performing a revised query; and
    returning a result set comprising vulnerability information for the input binary file.

11. The system of claim 10, wherein the search parameters are pattern matching instructions.

12. The system of claim 11, wherein the pattern matching instructions are provided as at least one regular expression.

13. The system of claim 12, further comprising constructing the at least one regular expression by:
    analyzing the extracted character string information from a set of binary input files by extracting version strings from the set of binary input files and grouping the extracted version strings by similarity amongst the version strings; and
    constructing a set of regular expressions to match at least two of the version strings having been grouped by similarity.

14. The system of claim 10, wherein all or part of the output of the pattern matching is processed to generate a filtered subset before the database query and wherein the database is queried based on the processed information.

15. The system of claim 10, further comprising:
    receiving multiple input binary files; and
    extracting character string information from the multiple input binary files.

16. The system of claim 10, wherein the vulnerability is a security vulnerability in a Linux-based firmware image.

17. The system of claim 10, wherein the binary file is a library or an application.

18. A non-transitory computer readable media comprising executable instructions for automatically identifying and extracting vulnerability information from binary files, the instructions for:
    processing an input binary file having a filename;
    extracting the filename and character string information from the input binary file into one or more separate data locations;
    defining search parameters to include the filename and an associated software version as a name-version pair;
    applying the defined search parameters to the extracted character string information in the one or more separate data locations to detect an instance of the name-version pair;
    if a match of the filename is found in the extracted information, then querying a vulnerability database of standards-based vulnerability management data based on the extracted name-version pair to identify a vulnerability in the input binary file; and
    if a match of the name-version pair is not detected, then:
      adding the name-version pair to a candidate set comprising multiple different software names and potential versions found in the input binary file;
      for a plurality of the name-version pairs in the candidate set, querying the vulnerability database for the software name;
      if any software names are found in the vulnerability database, then searching for a match on the associated software version;
      wherein if each software version query results in no match, then constructing a relaxed query by modifying the extracted character string information and performing a revised query; and
    returning a result set comprising vulnerability information for the input binary file.

* * * * *